United States Patent
Nakajyo

(10) Patent No.: US 9,552,933 B2
(45) Date of Patent: Jan. 24, 2017

(54) STORAGE MODULE AND METHOD FOR MANUFACTURING STORAGE MODULE

(71) Applicant: SUMITOMO HEAVY INDUSTRIES, LTD., Tokyo (JP)

(72) Inventor: Terunobu Nakajyo, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 256 days.

(21) Appl. No.: 14/287,604

(22) Filed: May 27, 2014

(65) Prior Publication Data

US 2014/0377634 A1 Dec. 25, 2014

(30) Foreign Application Priority Data

Jun. 20, 2013 (JP) ................. 2013-129275
Jun. 20, 2013 (JP) ................. 2013-129276

(51) Int. Cl.
*H01M 2/00* (2006.01)
*H01M 2/20* (2006.01)
*H01G 11/82* (2013.01)
*H01G 11/84* (2013.01)
*H01G 11/76* (2013.01)
*H01M 2/26* (2006.01)
*H01G 11/12* (2013.01)

(52) U.S. Cl.
CPC .............. *H01G 11/82* (2013.01); *H01G 11/76* (2013.01); *H01G 11/84* (2013.01); *H01M 2/202* (2013.01); *H01M 2/26* (2013.01); *H01G 11/12* (2013.01); *Y02E 60/13* (2013.01); *Y10T 29/417* (2015.01)

(58) Field of Classification Search
CPC ......... H01M 2/202; H01M 2/26; H01G 11/12; H01G 11/76; H01G 11/82; H01G 11/84; Y02E 60/13; Y10T 29/417
See application file for complete search history.

(56) References Cited

U.S. PATENT DOCUMENTS

| 5,487,958 | A | 1/1996 | Tura |
| 9,318,768 | B2 | 4/2016 | Yumura et al. |
| 2012/0234613 | A1 | 9/2012 | Miyatake |
| 2013/0065103 | A1 | 3/2013 | Yumura |

FOREIGN PATENT DOCUMENTS

| CN | 102906900 A | 1/2013 |
| WO | WO2011/070758 A1 | 6/2011 |
| WO | 2011/148641 A1 | 12/2011 |

OTHER PUBLICATIONS

Chinese Office Action application No. 201410228433.2 dated Feb. 2, 2016.

*Primary Examiner* — Brittany Raymond
(74) *Attorney, Agent, or Firm* — Squire Patton Boggs (US) LLP

(57) ABSTRACT

A storage module includes a plurality of stacked cell units, in which each of the cell units has a storage cell that has a pair of electrode tabs, and a frame body where the electrode tab of the storage cell that is adjacent in a stacking direction of the cell units is fixed, and each of the frame bodies has an elastic portion that presses the electrode tab to the other frame body other than one of the frame bodies.

7 Claims, 19 Drawing Sheets

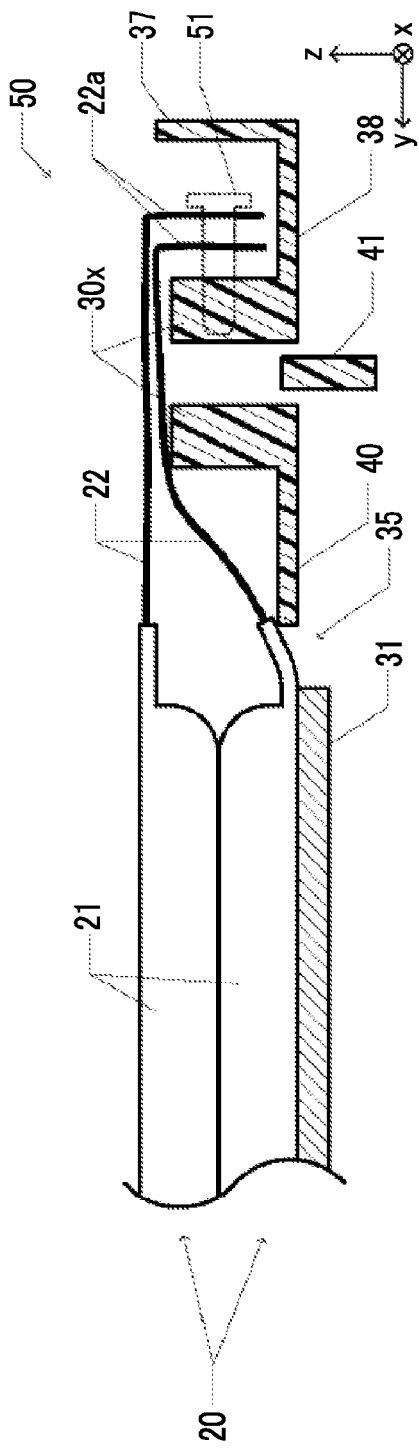
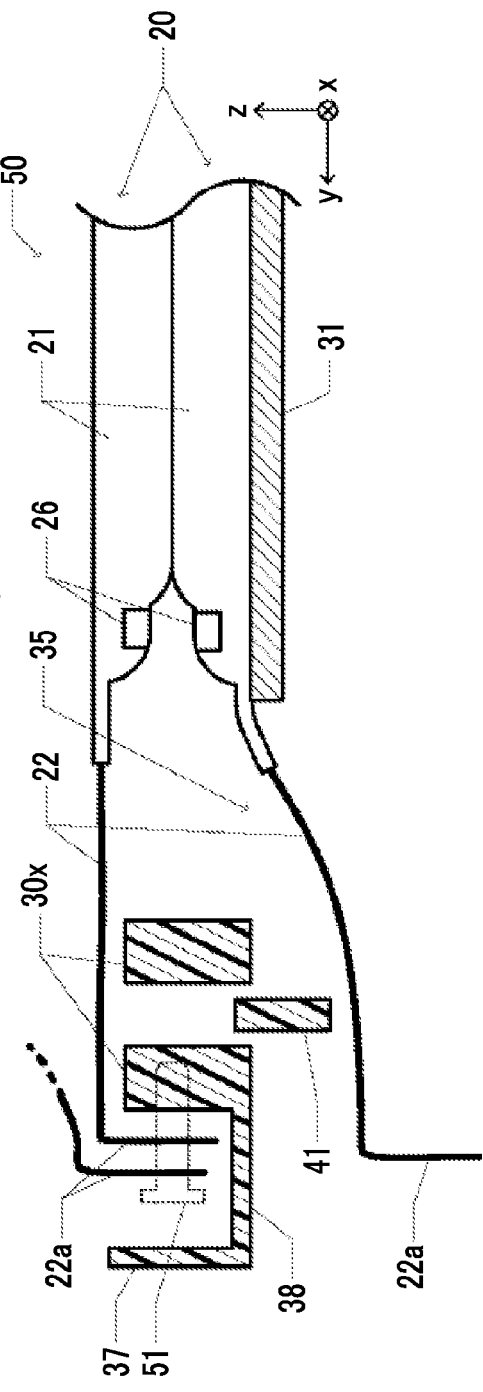

STORAGE MODULE AND METHOD FOR MANUFACTURING STORAGE MODULE

INCORPORATION BY REFERENCE

Priority is claimed to Japanese Patent Application No. 2013-129275, filed Jun. 20, 2013, the entire content of each of which is incorporated herein by reference.

BACKGROUND

Technical Field

The present invention relates to a storage module where a plurality of storage cells are stacked, and a method for manufacturing a storage module.

Description of the Related Art

In the related art, a storage module where a plurality of laminate type storage cells are stacked and connected in series is known. The laminate type storage cell has a structure in which a positive electrode plate and a negative electrode plate, which are alternately stacked via a separator, are pinched and sealed by two laminate films. An electrode tab is derived outward through between the two laminate films. The storage cells are mechanically supported when a compressive force in a stacking direction is applied after the storage cells are stacked.

SUMMARY

According to an embodiment of the present invention, there is provided a storage module including a plurality of stacked cell units, in which each of the cell units has a storage cell that has a pair of electrode tabs, and a frame body where the electrode tab of the storage cell that is adjacent in a stacking direction of the cell units is fixed, and each of the frame bodies has an elastic portion that presses the electrode tab to the other frame body other than one of the frame bodies.

According to another embodiment of the present invention, there is provided a method for manufacturing a storage module including stacking a plurality of cell units, each of which has a storage cell where a pair of electrode tabs are disposed and a frame body that supports the storage cell, and fixing the electrode tabs of the storage cell that is adjacent in a stacking direction of the cell units to each other after the stacking of the plurality of cell units, in which at least a part of an area of the electrode tab is arranged between the frame bodies that are adjacent to each other and temporary positioning is performed on the electrode tab when an elastic portion that is disposed in each of the frame bodies presses the electrode tab to the next frame body in the stacking of the plurality of cell units.

BRIEF DESCRIPTION OF THE DRAWINGS

FIG. 5A is a cross-sectional view taken along one-dot chain line VA-VA of FIGS. 4A and 4B, and FIG. 5B is a cross-sectional view taken along one-dot chain line VB-VB of FIGS. 4A and 4B.

DETAILED DESCRIPTION

In the laminate type storage cells, it is difficult to perform positioning on the storage cells in relation to within a plane orthogonal to the stacking direction during the stacking because the laminate films are flexible. In addition, it is difficult to connect the electrode tabs of the adjacent storage cells by ultrasonic welding after the stacking because the storage cells themselves spatially interfere with a welding device in the stacked state. Accordingly, it is preferable to perform the ultrasonic welding on the electrode tabs before the stacking. However, it is inconvenient to fold and stack the plurality of storage cells, which are connected through the ultrasonic welding, while aligning the storage cells, and this results in an increase in the number of assembly steps.

It is desirable to provide a storage module that is capable of reducing the number of steps for stacking storage cells to assemble the storage module. It is also desirable to provide a method for manufacturing the storage module.

Since the elastic portion presses the electrode tab to the frame body, temporary positioning can be performed on the electrode tab. As such, a storage module assembly operation can be efficient.

First Embodiment

Figure 1A:
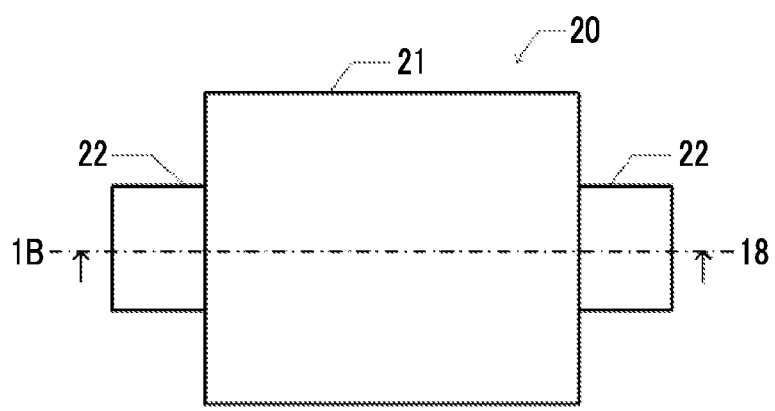
FIG. 1A is a plan view of a storage cell that is used in a storage module according to a first embodiment.

FIG. 1A is a plan view of a laminate type storage cell that is used in a storage module according to a first embodiment. An electric double layer capacitor, a lithium ion secondary battery, a lithium ion capacitor, or the like can be used as an example of the storage cell 20. A pair of electrode tabs 22 can be drawn out, in opposite directions, from two parallel edges of a storage container 21 that can have a substantially rectangular planar shape.

Figure 1B:
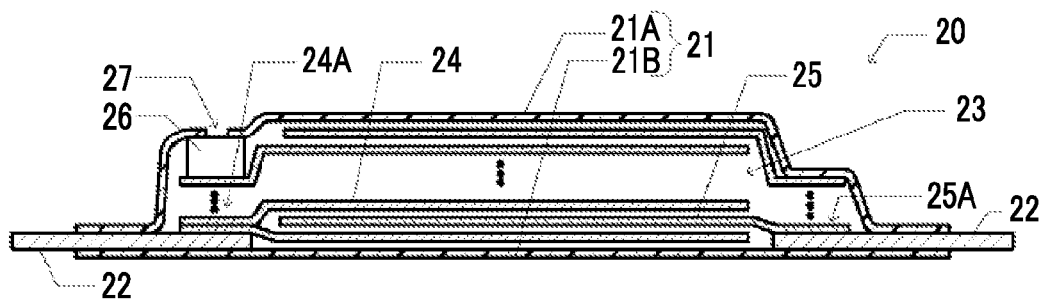
FIG. 1B is a cross-sectional view taken along one-dot chain line IB-IB of FIG. 1A.

FIG. 1B is a cross-sectional view taken along one-dot chain line IB-IB of FIG. 1A. Two aluminum laminate films 21A and 21B can constitute the storage container 21. The laminate films 21A and 21B can pinch a storage laminate body 23 and can seal the storage laminate body 23. The storage laminate body can have a positive electrode plate 24 and a negative electrode plate 25 that can be alternately stacked. The positive electrode plate 24 and the negative electrode plate 25 can be insulated by a separator that can be arranged between the positive electrode plate 24 and the negative electrode plate 25.

The one laminate film 21B can be substantially flat, and the other laminate film 21A can be deformed by reflecting the shape of the storage laminate body 23. The surface that can be substantially flat is referred to as a "back surface", and the surface that can be deformed is referred to as a "ventral surface".

The positive electrode plate 24 and the negative electrode plate 25 can respectively have connection portions 24A and 25A that can extend in opposite directions (leftward and rightward in FIG. 1A) from an area where the positive electrode plate 24 and the negative electrode plate 25 are superposed on each other. The connection portions 24A of a plurality of the positive electrode plates 24 can be superposed, and can be welded to one of the electrode tabs 22. The connection portions 25A of a plurality of the negative electrode plates 25 can be superposed, and can be welded to the other electrode tab 22. An aluminum plate or a copper plate can be used as an example of the electrode tab 22.

The electrode tabs 22 can be derived outside the storage container 21 by passing between the laminate film 21A and the laminate film 21B. The electrode tabs 22 can be heat-welded to the laminate film 21A and the laminate film 21B at the derived places.

A gas vent valve 26 can be arranged between the connection portion 24A of the positive electrode plate 24 and the laminate film 21A. The gas vent valve 26 can be arranged to block a gas vent hole 27 formed in the laminate film 21A and can be heat-welded to the laminate film 21A. A gas generated in the storage container 21 can be discharged outward through the gas vent valve 26 and the gas vent hole 27. The storage container 21 can be evacuated therein. Accordingly, the laminate films 21A and 21B can be deformed, due to the atmospheric pressure, along the outer shapes of the storage laminate body 23 and the gas vent valve 26.

Figure 2:
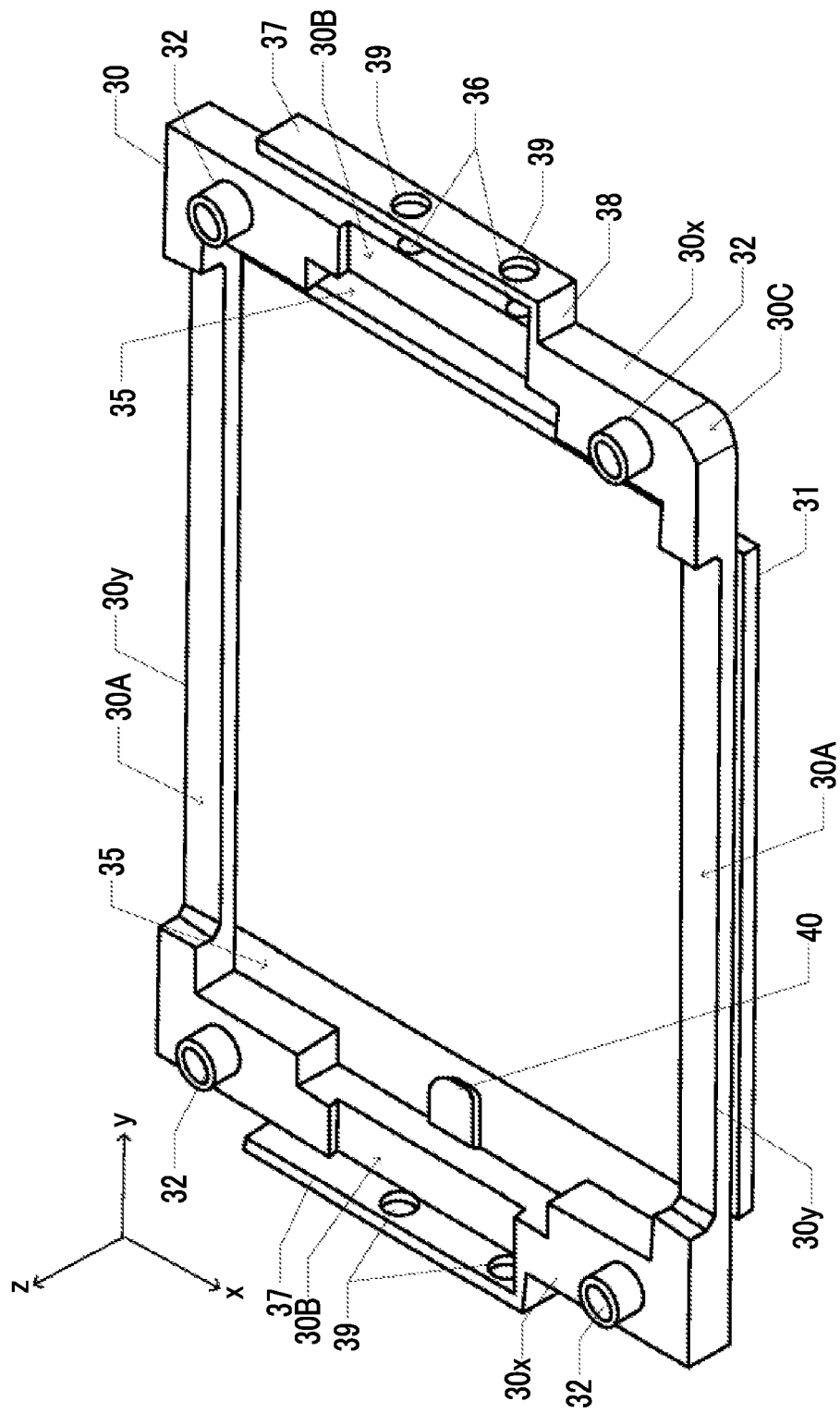
FIG. 2 is a perspective view of a frame body and a heat exchanger plate that are used in the storage module according to this embodiment.
Figure 3A:
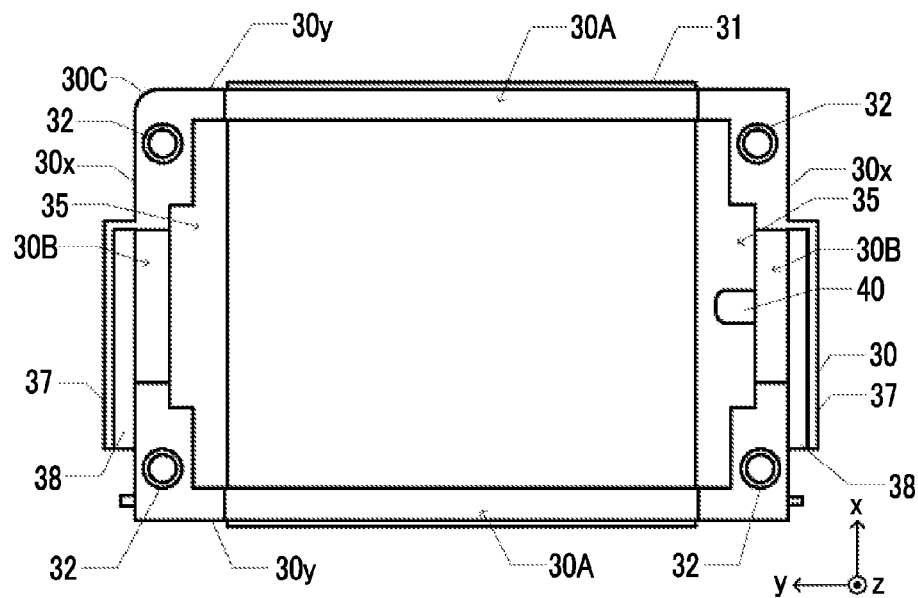
FIG. 3A is a plan view of the frame body and the heat exchanger plate that are used in the storage module according to this embodiment.
Figure 3B:
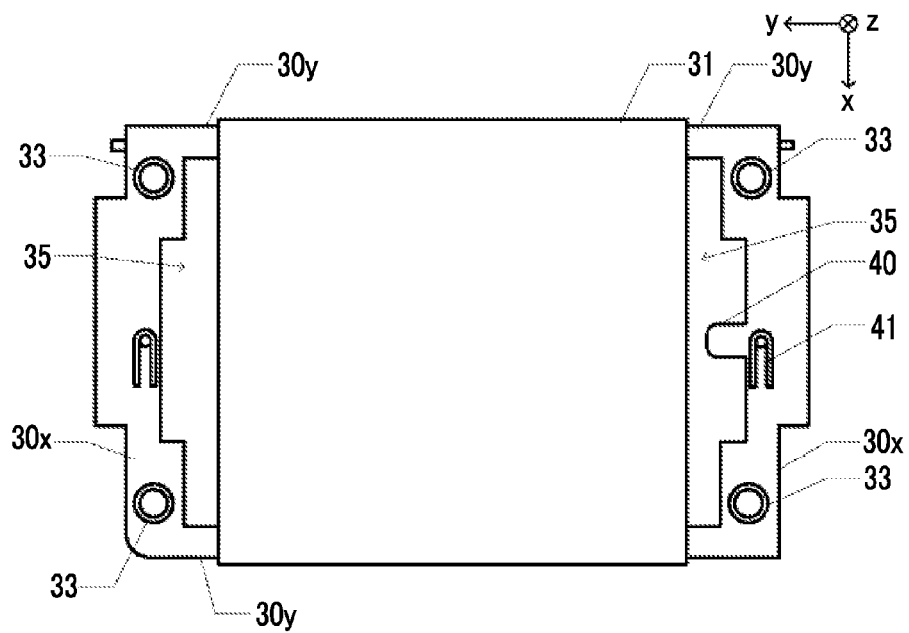
FIG. 3B is a bottom view of the frame body and the heat exchanger plate that are used in the storage module according to this embodiment.

FIG. 2 is a perspective view of a frame body and a heat exchanger plate that are used in the storage module according to this embodiment. FIG. 3A is a plan view of the frame body and the heat exchanger plate, and FIG. 3B is a bottom view of the frame body and the heat exchanger plate.

Hereinafter, structures of the frame body and the heat exchanger plate will be described with reference to FIGS. 2, 3A, and 3B.

The laminate type storage cell 20 (FIGS. 1A and 1B) can be accommodated inside a frame body 30 having a rectangular shape. Hereinafter, an xyz orthogonal coordinate system is defined for ease of understanding. A plane that is directed in a positive direction on a z axis of the frame body 30 is defined as an upper surface, and a plane that is directed in a negative direction is defined as a bottom surface. In this specification, the positive direction on the z axis is referred to as upward, and the negative direction is referred to as downward. The frame body 30 can have rectangular parts (x direction parts) 30x along sides parallel in the x direction, and rectangular parts (y direction parts) 30y along sides parallel in the y direction. A heat exchanger plate 31 can be mounted on the bottom surface of the frame body 30. The heat exchanger plate 31 can have a rectangular planar shape, and can be arranged to block most of an area surrounded by the frame body 30.

An insulating resin such as an ABS resin, polybutylene terephthalate (PBT), and polyphenylene sulfide (PPS) can be used in the frame body 30. A metal with high thermal conductivity such as aluminum can be used in the heat exchanger plate 31.

Convex portions 32 (FIGS. 2 and 3A) protruding upward can be formed on upper surfaces at four corners of the frame body 30. Each of the convex portions 32 can have a hollow cylindrical shape. Concave portions 33 (FIG. 3B) can be formed at areas on the bottom surface of the frame body 30 corresponding to the convex portions 32. When a plurality of frame bodies 30 are superposed in the z direction, the convex portions 32 of the frame body 30 on a lower side can be inserted into the concave portions 33 of the frame body 30 on an upper side. In this manner, relative positions of the plurality of frame bodies 30 in the xy plane can be constrained.

The heat exchanger plate 31 can be laid across the y direction parts 30y of the frame body 30, and can be separated from the x direction parts 30x. Accordingly, opening portions 35 can be formed between the x direction parts 30x of the frame body 30 and the heat exchanger plate 31. The heat exchanger plate 31 can further protrude outside from outside edges of the y direction parts 30y of the frame body 30.

The upper surfaces of areas 30A of the y direction parts 30y of the frame body 30 superposed on the heat exchanger plate 31 can be lower than the other areas. A step between the low area 30A and the other area can have a greater thickness than the heat exchanger plate 31. The heat exchanger plate 31 can be accommodated in the low areas 30A of the frame body 30 on the lower side in a state where the plurality of frame bodies 30 are stacked in the z direction. Accordingly, in the state where the frame bodies 30 are stacked in the z direction, the heat exchanger plate 31 cannot inhibit the contact between the bottom surface of the frame body 30 where the heat exchanger plate 31 is mounted and the upper surface of the frame body 30 on the lower side.

Areas 30B, which are a part of the upper surfaces of the x direction parts 30x of the frame body 30, can be lower than the other areas. The electrode tabs 22 (FIG. 1A) can be arranged on the low areas 30B.

A plurality of, for example, two screw holes (screw portions) 36 can be formed in outer circumferential side surfaces of the x direction parts 30x of the frame body 30. Protective plates 37 can be arranged to be parallel to the surfaces apart from the surfaces where the screw holes 36 are formed. The protective plates 37 can be supported by the frame body 30 via supporting walls 38. The electrode tabs 22 can be inserted between the protective plates 37 and the outer circumferential side surfaces of the frame body 30. The supporting wall 38 can be arranged at a position where the insertion of a tip end of the electrode tab 22 (FIG. 1A) arranged on the low area 30B into a gap between the x direction part 30x and the protective plate 37 is not inhibited.

Through-holes 39 can be formed in the protective plates 37. The through-hole 39 can be arranged at a place where an imaginary cylinder in which the screw hole 36 is extended in the y direction and the protective plate 37 intersect with each other. A screw can be screwed into the screw hole 36 by inserting a driver into the through-hole 39.

At three out of the four corners of the frame body 30, surfaces directed outside (outer circumferential surfaces) can intersect at substantially right angles. However, one corner 30C can be chamfered to have a curved surface shape. Since the one corner 30C is chamfered, directions of the frame body 30 in the x direction and the y direction can be easily obtained when the frame bodies 30 are stacked in the z direction.

As shown in FIG. 3B, elastic portions 41 can be disposed on the bottom surfaces of the x direction parts 30x. The elastic portions 41 can protrude downward from the bottom surface of the frame body 30.

An insertion inhibiting portion 40 can protrude from a surface of one of the x direction parts 30x that is directed inside toward an inner side of the frame body 30.

The frame body 30, the protective plates 37, the supporting walls 38, the insertion inhibiting portion 40, and the elastic portions 41 can be integrally molded with a resin. The heat exchanger plate 31 is, for example, screwed to the frame body 30. Alternatively, the heat exchanger plate 31 may be fixed to the frame body 30 when the frame body 30 is molded.

Figure 4A:
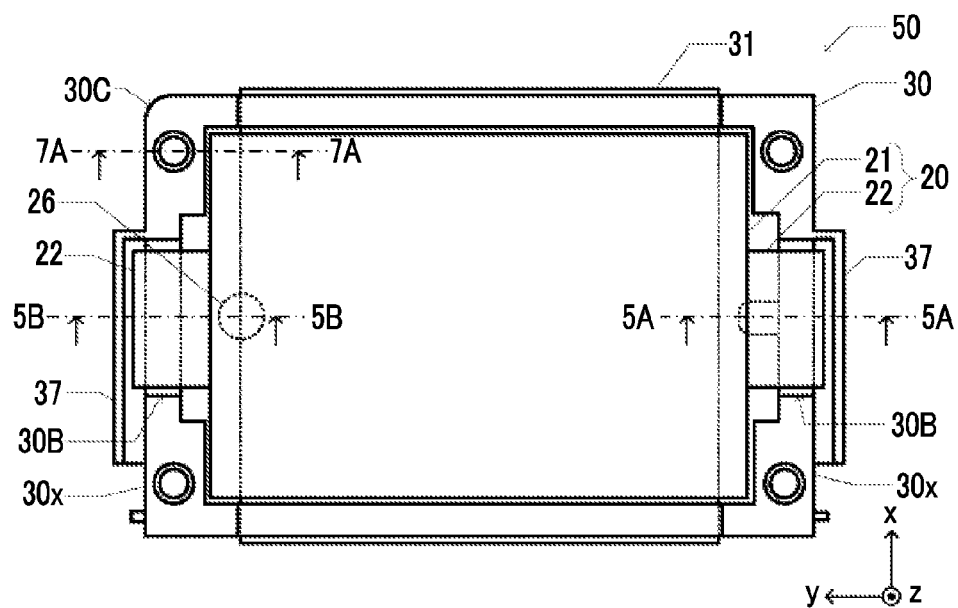
FIG. 4A is a plan view of a cell unit that is used in the storage module according to this embodiment.
Figure 4B:
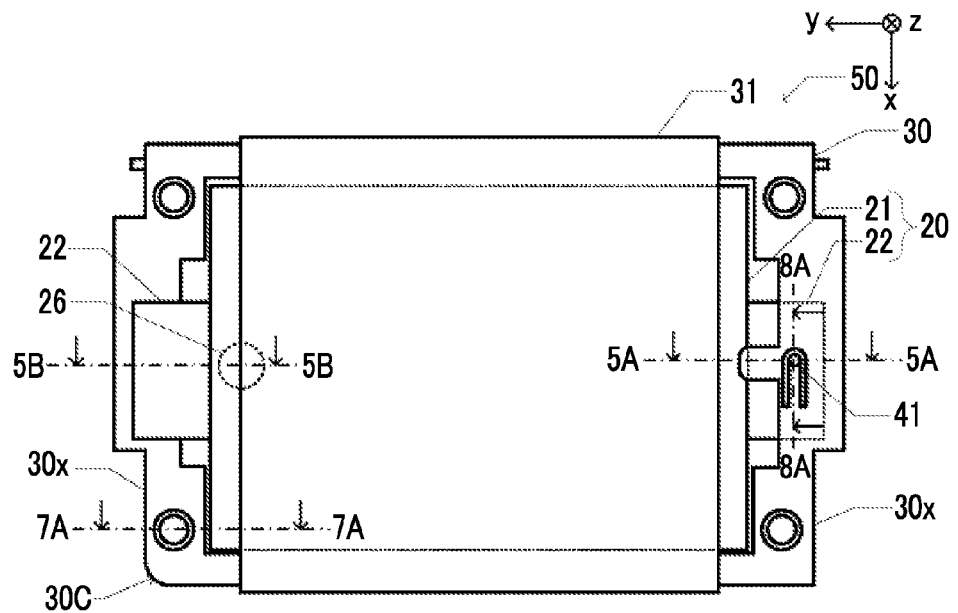
FIG. 4B is a bottom view of the cell unit that is used in the storage module according to this embodiment.

FIGS. 4A and 4B are a plan view and a bottom view respectively showing a cell unit 50 that constitutes the storage module according to this embodiment. The cell unit 50 can have the storage cell 20, the frame body 30, and the heat exchanger plate 31. In a plan view, the storage container 21 of the storage cell 20 may be accommodated inside the frame body 30 and may be supported by the frame body 30 to be supported by a supporting portion disposed in the frame body 30 or to be supported by the heat exchanger plate 31. The storage container 21 can be positioned in relation to the direction in the xy plane with respect to the frame body 30 by a surface of the frame body 30 that is directed inside (inner circumferential surface). In this case, the storage cell 20 can be accommodated in the frame body 30 such that the gas vent valve 26 (FIG. 1B) is positioned on the chamfered corner 30C side in relation to the y direction. When the cell unit 50 is stacked such that the position of the chamfered corner 30C is aligned, the position of the gas vent valve 26 of the storage cell 20 can also be aligned. Accordingly, it is possible to prevent an assembly of the storage cell 20 in a state where the posture of the storage cell 20 is inverted in relation to the y direction.

The electrode tab 22 of the storage cell 20 can intersect with the x direction part 30x of the frame body 30, and the tip end of the electrode tab 22 can be inserted into the gap between the x direction part 30x and the protective plate 37. The electrode tab 22 can be arranged on the low area 30B of the x direction part 30x.

FIG. 5A is a cross-sectional view taken along one-dot chain line VA-VA of FIGS. 4A and 4B. The cell unit 50 can have the two storage cells 20. The two storage cells 20 can be stacked on the heat exchanger plate 31 with the ventral surfaces facing each other.

The protective plate 37 can be arranged on a further outer side than the x direction part 30x. The protective plate 37 can be fixed to the x direction part 30x via the supporting wall 38. Each of the electrode tabs 22 of the storage cell 20 can extend in a direction intersecting with the z direction, specifically, in the negative direction on the y axis. The tip ends of the electrode tabs 22 can be bent in the stacking direction (z direction). In this specification, the part where the tip end of the electrode tab 22 is bent is referred to as a tip end portion 22a.

The electrode tab 22 of the storage cell 20 on the lower side can be derived from the storage container 21 and then be lifted to the upper surface of the x direction part 30x from the substantially same height as an upper surface of the heat exchanger plate 31. The electrode tab 22 of the storage cell 20 on the upper side, from a base portion thereof to a bent place, can be arranged at a position that is slightly higher than the upper surface of the x direction part 30x.

The tip end portions 22a of the electrode tabs 22 of the two storage cells 20 can be bent in the same direction (negative direction on the z axis), and can be superposed on each other in the gap between the x direction part 30x and the protective plate 37. When the storage module is completed, the two tip end portions 22a can be fixed to each other with a fastening tool 51 such as a screw and can be fixed to the frame body 30. The fastening tool 51 can be screwed to the screw hole 36 (FIG. 2).

Figure 6:
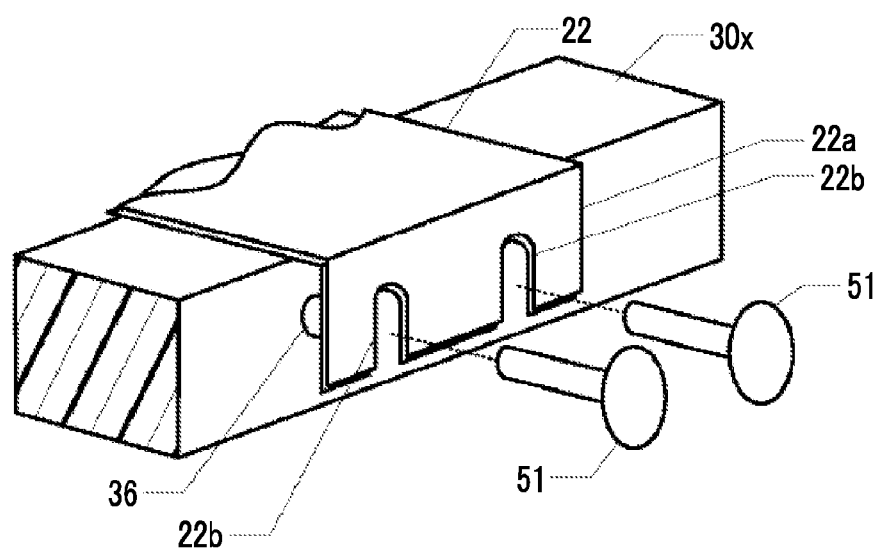
FIG. 6 is a perspective view of a place where an electrode tab is fixed.

FIG. 6 is a perspective view of the place where the tip end portion 22a is fixed. A plurality of U-shaped notches 22b can be formed in the tip end portion 22a. Positions of the two tip end portions 22a can be adjusted such that the notches 22b are superposed on each other. The fastening tool 51 can penetrate the notch 22b to be screwed to the screw hole 36 disposed at the x direction part 30x. The screw hole 36 can be configured as a metallic female screw embedded in the resinous frame body 30.

FIG. 5B is a cross-sectional view taken along one-dot chain line VB-VB of FIGS. 4A and 4B. As in the structure shown in FIG. 5A, the protective plate 37 can be arranged on a further outer side than the x direction part 30x. The protective plate 37 can be fixed to the x direction part 30x via the supporting wall 38. Each of the electrode tabs 22 of the storage cell 20 can extend in a direction intersecting with the z direction, specifically, in the positive direction on the y axis. The tip ends of the electrode tabs 22 can be bent in the stacking direction (z direction).

In the electrode tab 22 of the storage cell 20 on the lower side, the tip end portion 22a thereof can be arranged below the x direction part 30x through the opening portion 35 between the x direction part 30x and the heat exchanger plate 31. After the electrode tab 22 of the storage cell 20 on the upper side passes on the x direction part 30x, the tip end portion 22a thereof can be inserted into the gap between the x direction part 30x and the protective plate 37. Of the storage cells 20 of the cell unit 50 stacked thereon, the tip end portion 22a of the electrode tab 22 of the storage cell 20 that is arranged on the lower side can also be inserted into this gap. The two electrode tabs 22 that are inserted into this gap can be fixed to each other by the fastening tool 51 and can be fixed to the frame body 30.

As shown in FIG. 5A, one of the electrode tabs 22 of the storage cell 20, that is, the electrode tab 22 on the negative side on the y axis can be connected to the electrode tab 22 of the other storage cell 20 in the same cell unit 50. As shown in FIG. 5B, the other electrode tab 22 of the storage cell 20, that is, the electrode tab 22 on the positive side on the y axis can be connected to the electrode tab 22 of the storage cell 20 in the next cell unit 50.

The upper surface (back surface) of the storage cell 20 that is arranged on the upper side in the cell unit 50 can protrude upward from the upper surface of the frame body 30. In other words, the combined thickness of the two storage cells 20 can be greater than the thickness from the bottom surface (that is, the upper surface of the heat exchanger plate 31) of the frame body 30 to the upper surface of the frame body 30. Herein, the "upper surface of the frame body 30" means an area other than the low areas 30A and 30B shown in FIG. 2.

The insertion inhibiting portion 40 (FIG. 5A) can function to prevent an assembly operator from inserting, by mistake, the electrode tab 22 into the opening portion 35 (FIG. 5A). Since the insertion inhibiting portion 40 is arranged in one of the opening portions 35, the assembly operator can easily recognize which one of the two opening portions 35 (FIGS. 2, 3A, and 3B) formed in the frame body 30 to be penetrated by the electrode tab 22. In this manner, it is possible to prevent a wrong selection of the opening portion 35 to be penetrated by the electrode tab 22, and the assembly operation can be efficient.

Figure 7A:
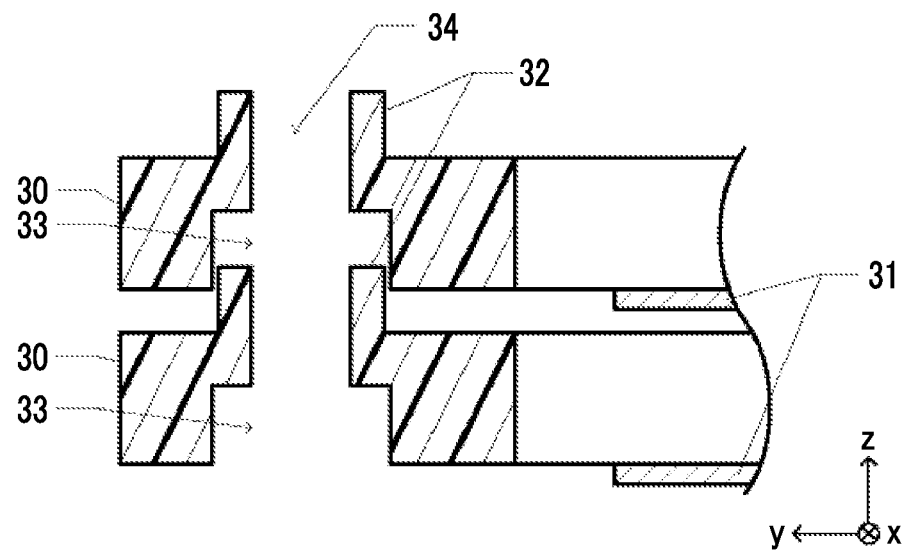
FIG. 7A is a cross-sectional view taken along one-dot chain line VIIA-VIIA of FIGS. 4A and 4B.

FIG. 7A is a cross-sectional view taken along one-dot chain line VIIA-VIIA of FIGS. 4A and 4B. The convex portions 32 can be formed on the respective upper surfaces of the frame bodies 30, and the concave portions 33 can be formed on the respective bottom surfaces. A through-hole 34 can be formed to reach a bottom surface of the concave portion 33 from an upper surface of the convex portion 32. In this manner, the convex portion 32 can have a hollow cylindrical shape.

The convex portion 32 that is formed on the frame body 30 on the lower side, of the two frame bodies 30 adjacent in the z direction (stacking direction), can be inserted into the concave portion 33 that is formed on the frame body 30 on the upper side. As described with reference to FIGS. 5A and 5B, the combined thickness of the two storage cells 20 is greater than the thickness from the bottom surface to the upper surface of the frame body 30, and thus the upper surface of the frame body 30 on the lower side cannot be in contact with the bottom surface of the frame body 30 on the upper side. A gap can be formed between a tip end of the convex portion 32 and the bottom surface of the concave portion 33 into which the convex portion 32 is inserted. Accordingly, a positioning portion that the convex portion 32 and the concave portion 33 constitute can constrain relative positions of the cell units 50 that are stacked in relation to within the xy plane, but can allow the displacement in a direction closer in the z direction. As described later, the frame bodies 30 can be displaced in a direction to be closer to each other when the cell units 50 are stacked and then the compressive force in the z direction is applied to the stacked cell units.

Figure 7B:
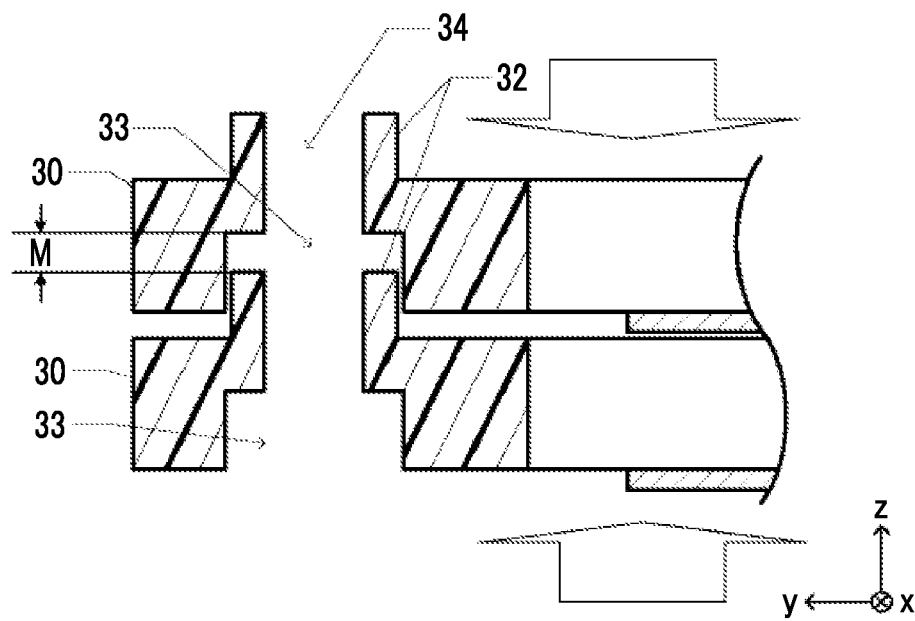
FIG. 7B is a cross-sectional view of a state where a compressive force is applied to the cell unit that is stacked.

FIG. 7B is a cross-sectional view of the positioning portion at a time when the compressive force is applied in the z direction. When the compressive force is applied, each of the storage cells 20 (FIGS. 5A and 5B) can be deformed to be thin and the frame bodies 30 can be displaced in the direction to be closer to each other. Even after the application of the compressive force, the upper surfaces and the bottom surfaces of the two frame bodies 30 adjacent in the z direction can remain out of contact, and a margin M in the direction for the frame bodies 30 to be further closer in the z direction can be left.

Since variations are present in the thickness of the storage cell 20, a place where the frame bodies 30 are in contact with each other may be generated in a case where the margin M is not left in a state where the compressive force is applied. When the frame bodies 30 are in contact with each other, the compressive force that is applied to the stacked cell units 50 is applied in a distributed manner to the storage cell 20 and the frame body 30. Accordingly, the compressive force that is added to the storage cell 20 is weakened.

In this embodiment, the margin M can be left, and thus the compressive force can be preferentially applied to each of the storage cells 20 even when the variations are present in the thickness of the storage cell 20. Accordingly, the compressive force can be uniformly distributed to all the storage cells 20. This compressive force can suppress a reduction in electrical characteristics of the storage cell 20 and can firmly fix the position of the storage cell 20.

Figure 8A:
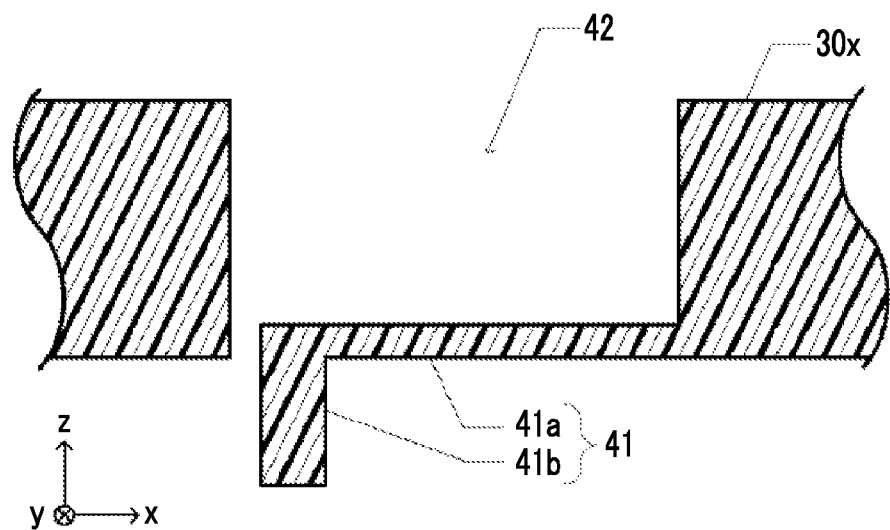
FIG. 8A is a cross-sectional view taken along one-dot chain line VIIIA-VIIIA of FIG. 4B.

FIG. 8A is a cross-sectional view taken along one-dot chain line VIIIA-VIIIA of FIG. 4B. The elastic portion 41 can be mounted on a side surface of a through-hole 42 that penetrates the x direction part 30x in a thickness direction (z direction). The elastic portion 41 can have a cantilever beam structure, and a protrusion 41b that protrudes downward can be formed at a tip end of a cantilever beam 41a. The elastic portion 41 can be integrally molded with the frame body 30.

Figure 8B:
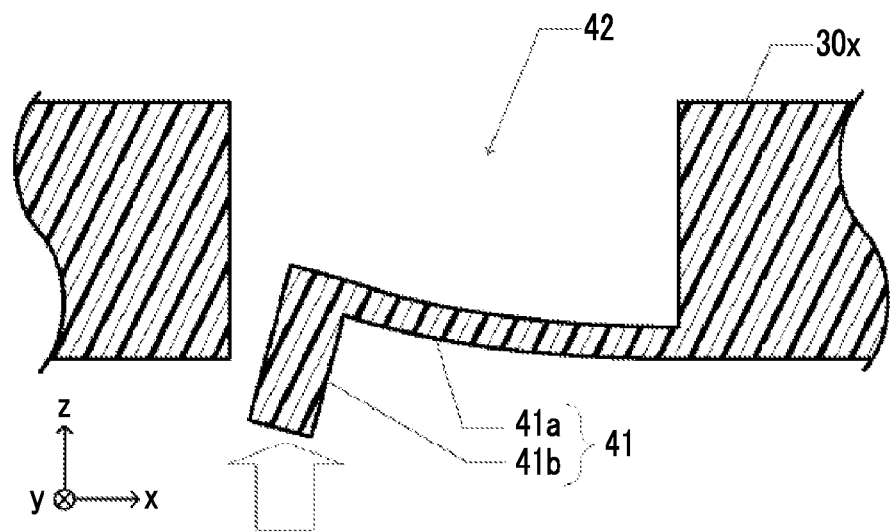
FIG. 8B is a cross-sectional view of a state where an elastic portion is deformed.

As shown in FIG. 8B, the cantilever beam 41a can be elastically deformed to cause the protrusion 41b to be displaced upward when an upward force is applied to a lower end of the protrusion 41b. In this state, a force to displace the protrusion 41b downward can be generated by a restoring force of the cantilever beam 41a.

Figure 9:
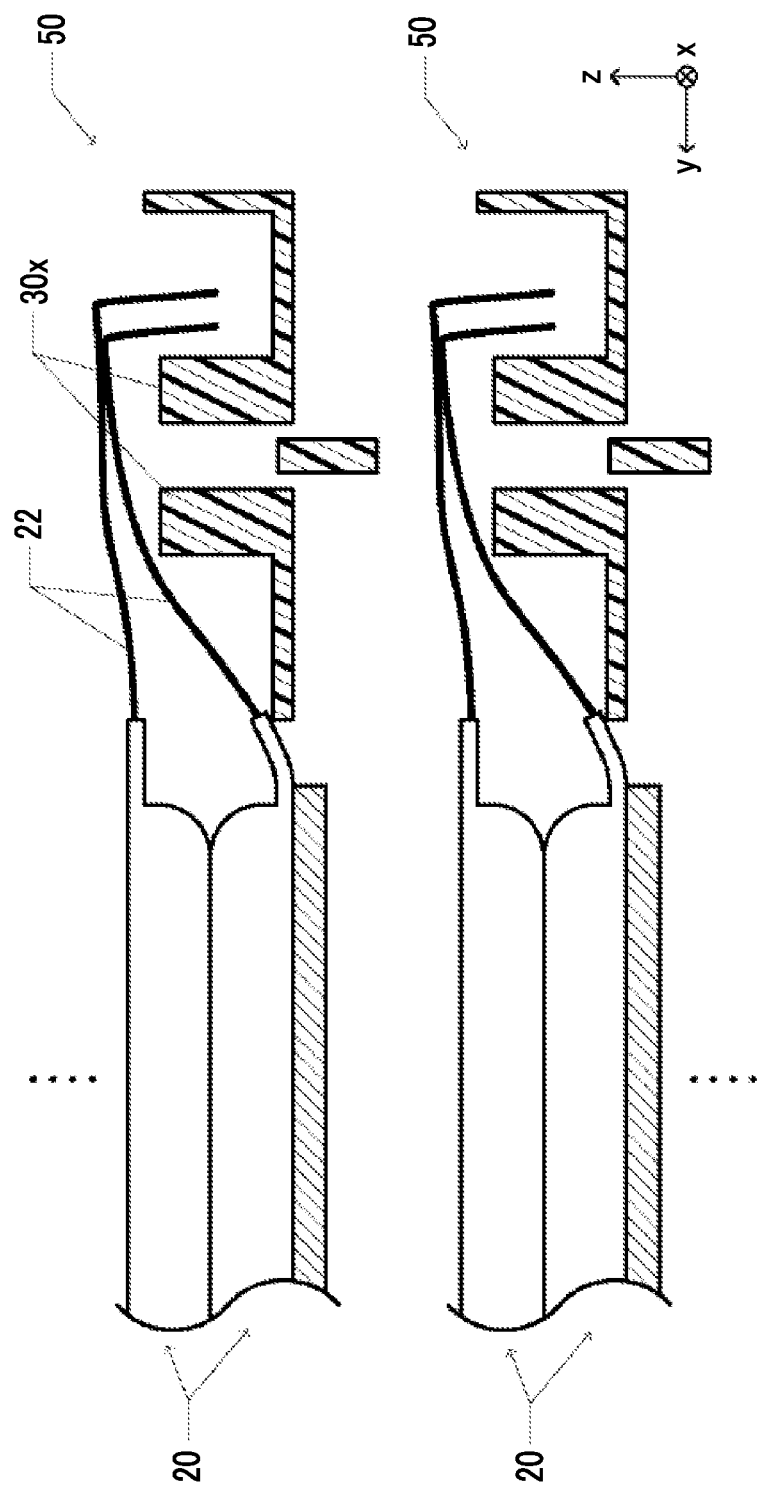
FIG. 9 is a partial cross-sectional view of the two cell units that are not stacked yet.

A procedure for stacking the cell units 50 will be described with reference to FIGS. 9 to 11. FIG. 9 is a partial cross-sectional view of the two cell units 50 that are not stacked yet. The electrode tab 22 of the storage cell 20 on the lower side in the cell unit 50 is pushed upward in contact with an edge of the upper surface of the x direction part 30x, and thus the electrode tab 22 can float from the upper surface of the x direction part 30x.

Figure 10:
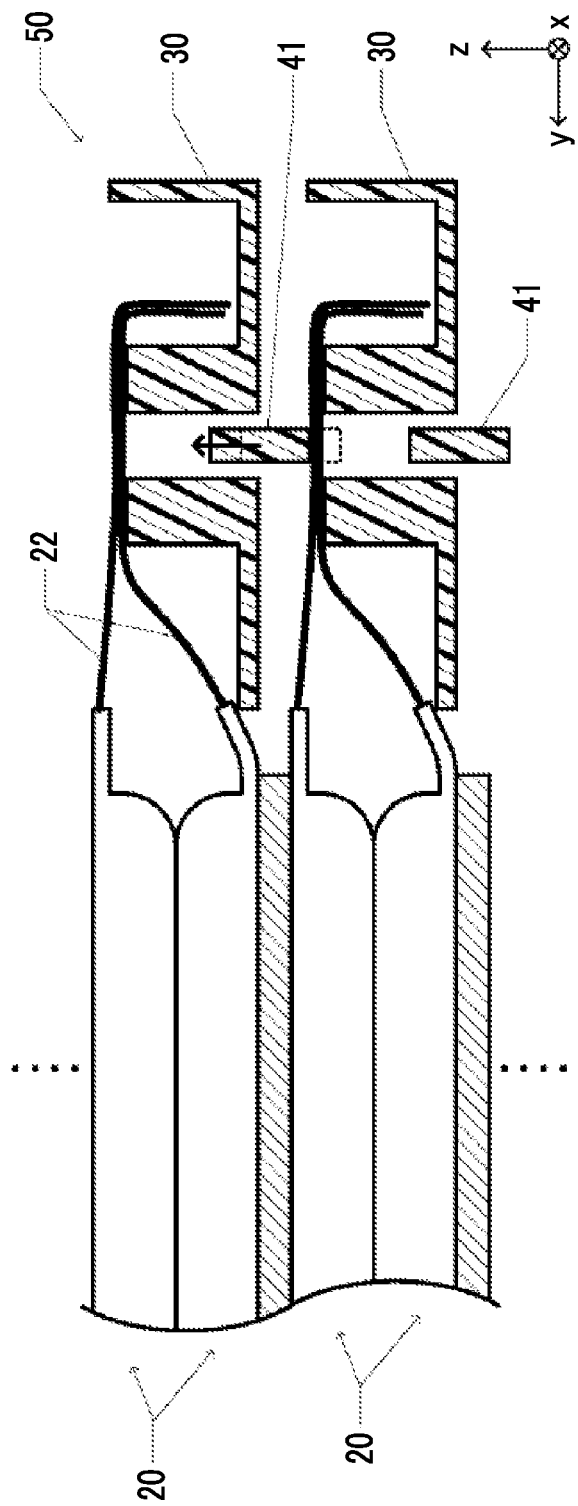
FIG. 10 is a partial cross-sectional view of the two cell units in a stacked state.

FIG. 10 is a partial cross-sectional view of the two cell units 50 in a stacked state. The electrode tabs 22 of the two storage cells 20 in the cell unit 50 can be arranged between the frame bodies 30 adjacent in the stacking direction. Furthermore, the tip ends of the electrode tabs 22 can be derived from the inner sides of the frame bodies 30 to outer sides of the x direction parts 30x. When the cell units 50 are stacked, the elastic portions 41 can add a force in the negative direction on the z axis to the electrode tabs 22 arranged between the frame bodies 30 such that the electrode tabs 22 can be pressed to the frame bodies 30. In this case, the cantilever beam 41a of the elastic portion 41 can be elastically deformed as shown in FIG. 8B.

Since the electrode tab 22 is pressed to the frame body 30, temporary positioning can be performed on the electrode tab 22. In this manner, the shape and the position of the electrode tab 22 can be determined and the position of the tip end portion 22a can be aligned.

Figure 11:
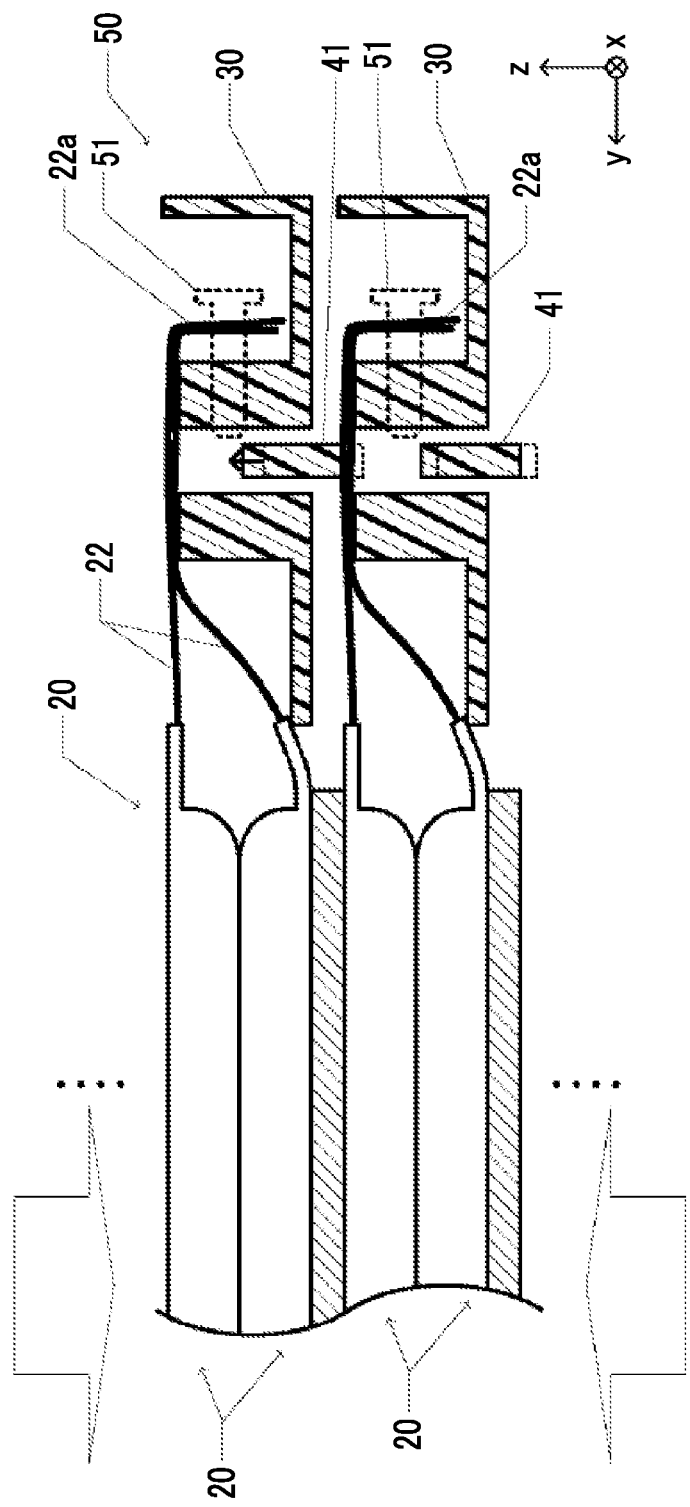
FIG. 11 is a partial cross-sectional view of the two cell units that are stacked in a state where the compressive force is applied.

FIG. 11 is a partial cross-sectional view of the cell unit 50 in a state where the compressive force is applied in the stacking direction. The gap between the frame bodies 30 can be narrowed as each of the storage cells 20 is compressed. In this manner, the amount of the deformation of the cantilever beam 41a (FIG. 8B) of the elastic portion 41 can be increased. The electrode tabs 22 can be pressed to the frame bodies 30 with a larger force. In this state, the tip end portion 22a of the electrode tab 22 can be fixed to the frame body 30 by the fastening tool 51.

Figure 12:
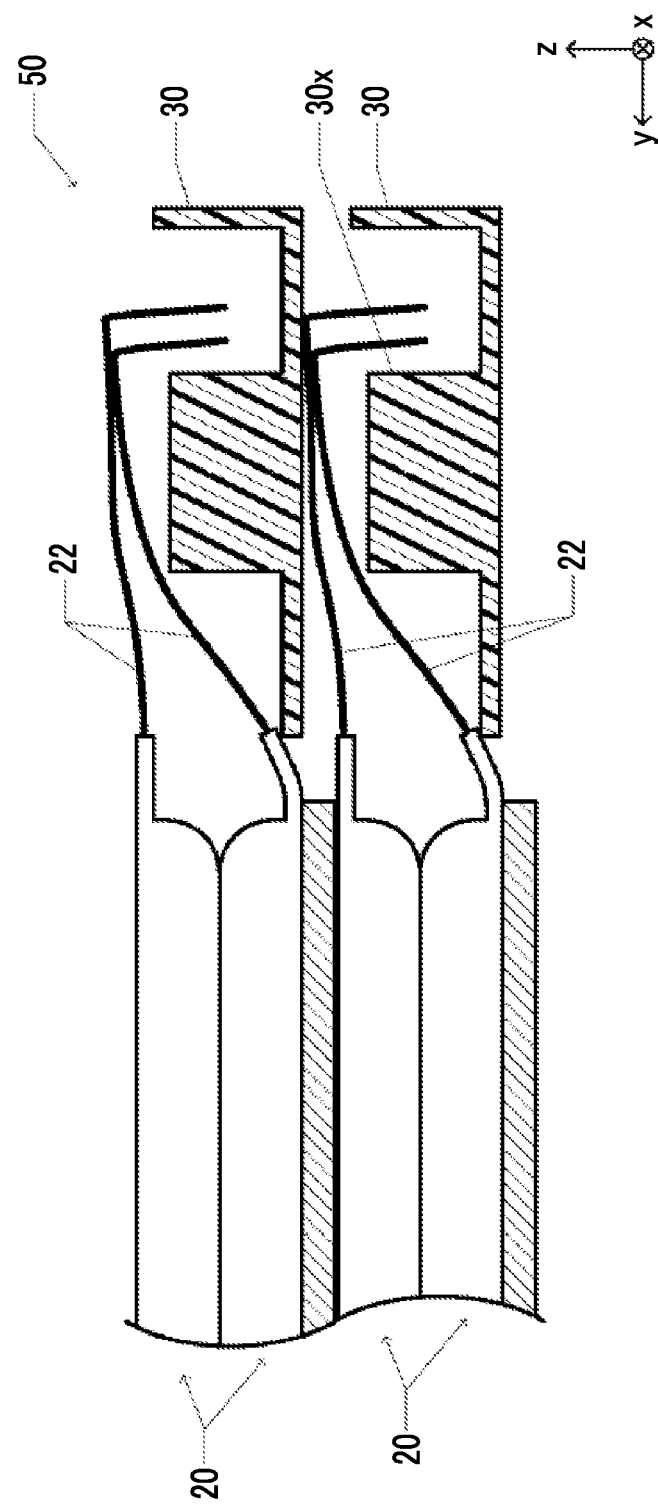
FIG. 12 is a partial cross-sectional view of two cell units according to a comparative example that are stacked.

FIG. 12 is a partial cross-sectional view of the cell unit 50 at a time when the cell unit 50 using the frame body 30 where the elastic portion 41 (FIG. 10) is not disposed is stacked. The electrode tabs 22 can remain floating from the upper surfaces of the x direction parts 30x even when the cell unit 50 is stacked, and thus the electrode tabs 22 cannot be pressed to the frame bodies 30. Accordingly, the shape and the position of the electrode tab 22 cannot be determined and the notches 22b shown in FIG. 6 cannot be superposed on the screw holes 36. The assembly operator has to adjust the positions of the notches 22b (FIG. 6) and the screw holes 36 (FIG. 6) by inserting a thin tool between the stacked frame bodies 30 and pressing the electrode tabs 22 to the frame bodies 30.

In this embodiment, the shape and the position of the electrode tab 22 are determined in a state where the cell unit 50 is stacked, and thus the notch 22b (FIG. 6) and the screw hole 36 (FIG. 6) can be substantially superposed. In this manner, the operation efficiency can be increased during the assembly.

The temporary positioning of the electrode tabs 22 positioned on the negative side on the y axis has been described with reference to FIGS. 9 to 11. Temporary positioning can be performed in a similar manner, by the elastic portion 41 (FIG. 5B), also on the electrode tabs 22 positioned on the positive side on the y axis. In this case, the positioning can be performed by the elastic portion 41 (FIG. 5B) on the electrode tabs 22 in the two storage cells 20 that are accommodated in the different cell units 50 and adjacent in the stacking direction as shown in FIG. 5B.

Second Embodiment

Figure 13:
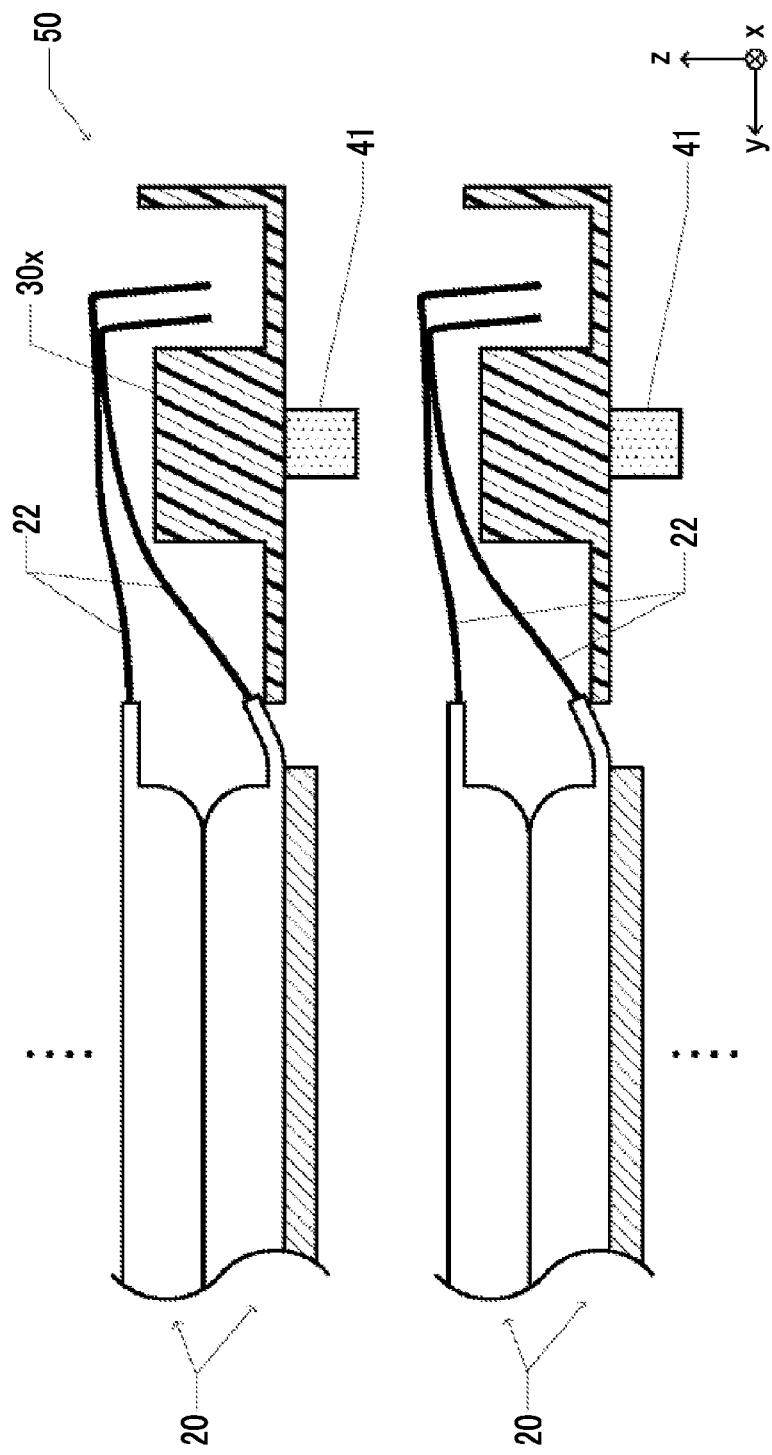
FIG. 13 is a partial cross-sectional view of a cell unit that is used in a storage module according to a second embodiment.

FIG. 13 is a partial cross-sectional view of the cell unit 50 that is used in a storage module according to a second embodiment. Hereinafter, only differences from the first embodiment will be described and description of the identical configuration will be omitted. In this embodiment, a sponge is used in the elastic portion 41. The elastic portion 41 that is formed of the sponge is attached to the bottom surface of the x direction part 30x.

Figure 14:
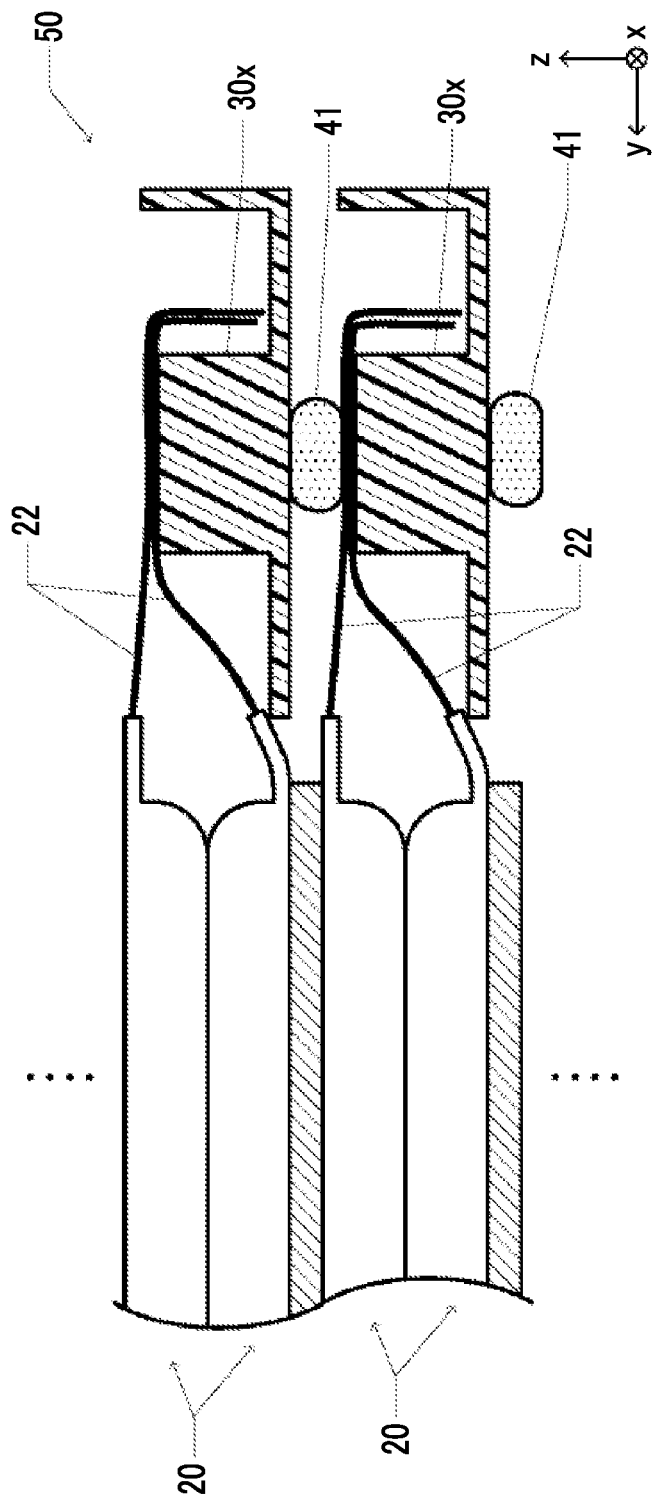
FIG. 14 is a partial cross-sectional view of the cell unit in a state where the cell unit that is used in the storage module according to this embodiment is stacked.

FIG. 14 is a partial cross-sectional view of the cell unit 50 in a stacked state. When the cell unit 50 is stacked, the elastic portion 41 that is formed of the sponge can be in contact with the electrode tabs 22 and can be elastically deformed such that the electrode tabs 22 can be pressed to the x direction part 30x of the lower frame body 30. The shape and the position of the electrode tab 22 are determined as in the first embodiment, and thus the notch 22b (FIG. 6) and the screw hole 36 (FIG. 6) can be substantially superposed. In this manner, the operating efficiency can be increased during the assembly.

Third Embodiment

Figure 15:
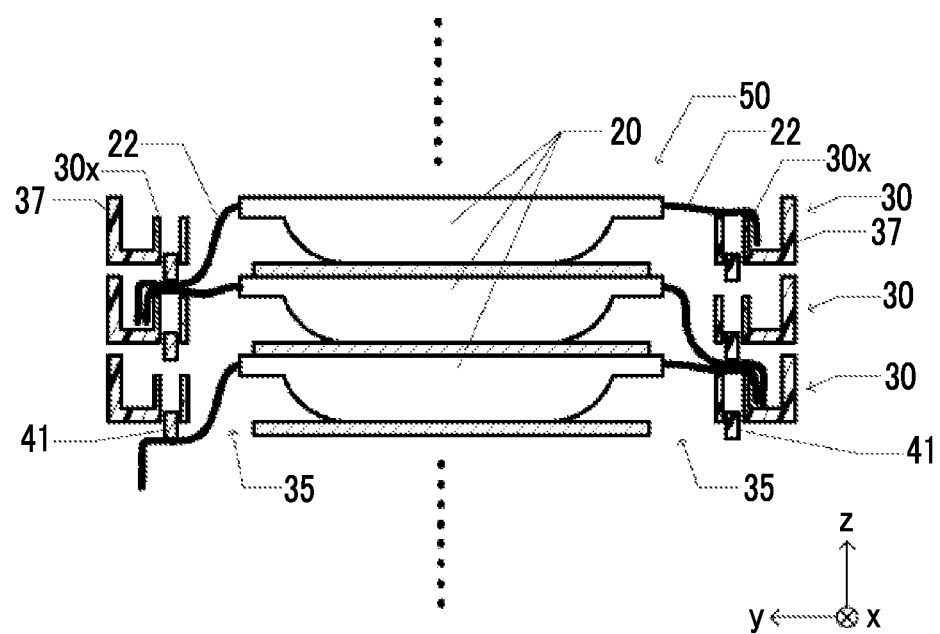
FIG. 15 is a cross-sectional view of a storage module according to a third embodiment.

FIG. 15 is a cross-sectional view showing a storage module according to a third embodiment. Hereinafter, only differences from the first embodiment will be described and description of the identical configuration will be omitted.

In the first embodiment, the two storage cells 20 are supported by the one frame body 30 as shown in FIGS. 5A and 5B. In this embodiment, however, the one storage cell 20 is supported by the one frame body 30. For example, in the odd-numbered one of the cell units 50 lined up in the stacking direction, the electrode tab 22 on the right side in FIG. 15 can be inserted into the gap between the x direction part 30x and the protective plate 37 on the right side of the frame body 30 where the storage cell 20 is supported. The electrode tab 22 on the left side can be inserted, through the opening portion 35, into the gap between the x direction part 30x and the protective plate 37 on the left side of the cell unit 50 adjacent on the lower side.

In contrast, in the even-numbered cell unit 50, the electrode tab 22 on the left side can be inserted into the gap between the x direction part 30x and the protective plate 37 on the left side of the frame body 30 where the storage cell 20 is supported. The electrode tab 22 on the right side can be inserted, through the opening portion 35, into the gap between the x direction part 30x and the protective plate 37 on the right side of the cell unit 50 adjacent on the lower side. In other words, the configuration of the electrode tabs 22 can be inverted in relation to the y direction by the odd-numbered cell unit 50 and the even-numbered cell unit 50.

Even in this embodiment, the elastic portion 41 is disposed in the frame body 30. The elastic portion 41 can press the electrode tab 22 to the frame body 30 on the lower side. Since the shape and the position of the electrode tab 22 are determined as in the first embodiment, the notch 22b (FIG. 6) and the screw hole 36 (FIG. 6) can be substantially superposed. In this manner, the operating efficiency can be increased during the assembly.

Fourth Embodiment

Figure 16A:
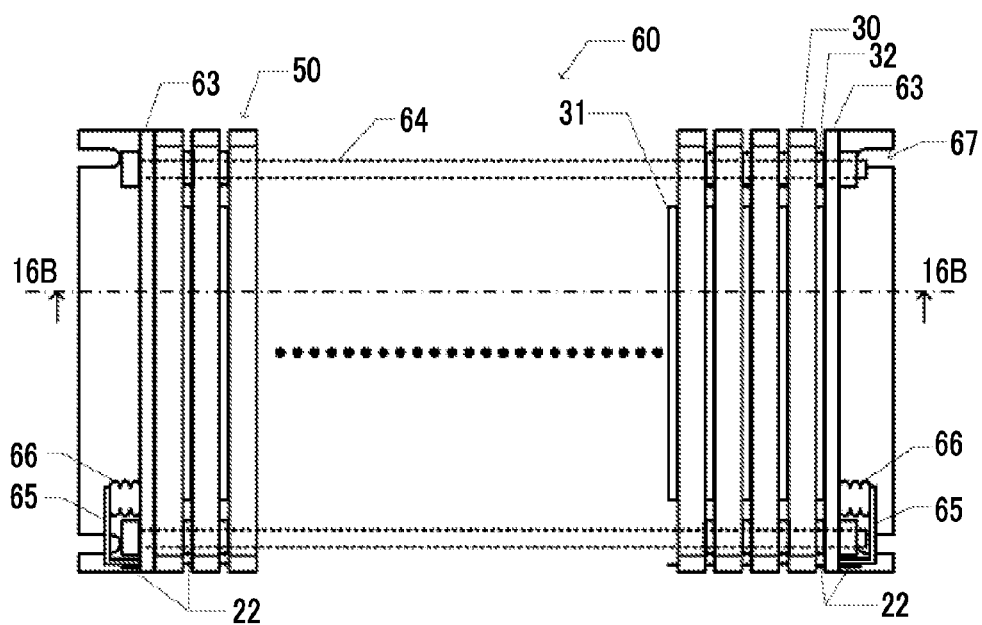
FIG. 16A is a plan view of a storage module according to a fourth embodiment.

FIG. 16A is a plan view of a storage module 60 according to a fourth embodiment. The plurality of cell units are stacked in the thickness direction thereof. The compressive force in the stacking direction can be applied to the stacked cell units 50 by a pressurization mechanism. The pressurization mechanism can have pressurization plates 63 arranged at both ends of the stacked cell units 50, and a plurality of, for example, four tie rods 64. The tie rods 64 can penetrate one of the pressurization plates 63 to reach the other pressurization plate 63. When bolts are fastened to tip ends of the tie rods 64, a force to cause the two pressurization plates 63 to approach each other can be applied to the two pressurization plates 63. In this manner, the compressive force in the stacking direction can be applied to the stacked cell units 50.

The tie rods 64 can pass into the concave portion 33 (FIG. 7A) and the through-hole 34 (FIG. 7A) formed in the frame body 30. When a spacer is inserted between the cell unit 50 and the pressurization plate 63 at the right end in FIG. 16A, the contact between the tip end of the convex portion 32 of the frame body 30 arranged at the right end and the pressurization plate 63 can be avoided.

Relay bus bars 65 can be mounted on surfaces on outer sides of the pressurization plates 63 via insulators 66. One of the electrode tabs 22 of each of the cell unit 50 at both of the ends can be electrically connected to the relay bus bar 65. The relay bus bar 65 is a terminal that performs charging and discharging on a series connection circuit of the storage cell 20.

One edge (edge on the back side of the page face in FIG. 16A) of the pressurization plate 63 can be bent into an L shape. A U-shaped screw notch 67 can be formed at a part further to the tip end than the bent place.

Figure 16B:
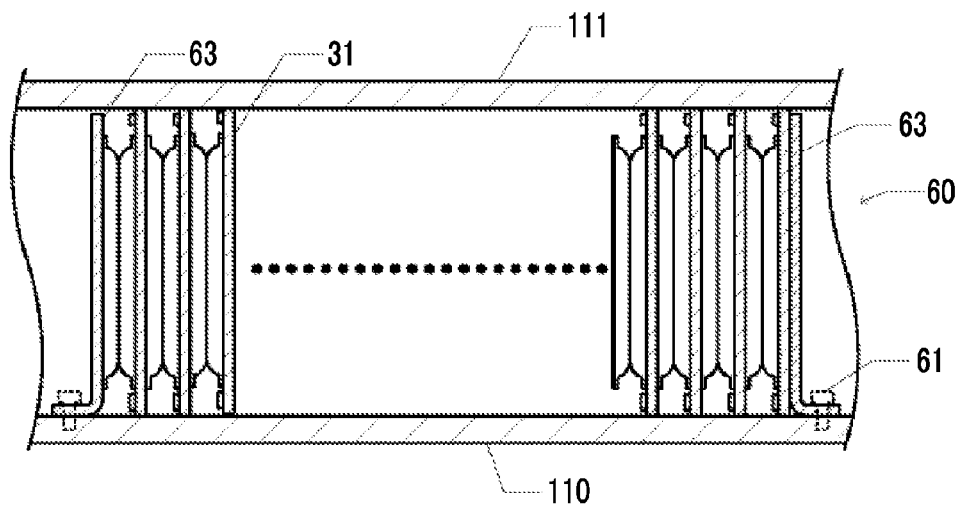
FIG. 16B is a cross-sectional view taken along one-dot chain line XVIB-XVI6B of FIG. 16A.

FIG. 16B is a cross-sectional view taken along one-dot chain line XVIB-XVIB of FIG. 16A. The storage module 60 according to this embodiment can be fixed, with screws 61, to a bottom surface of a lower housing 110. An end surface of the heat exchanger plate 31 can be in contact with the bottom surface of the lower housing 110. An upper housing 111 can be arranged on the storage module 60. An end surface on the upper side of the heat exchanger plate 31 can be in contact with the upper housing 111. The heat exchanger plate 31 can transmit heat generated in the storage cell 20 to the lower housing 110 and the upper housing 111.

Fifth Embodiment

Figure 17A:
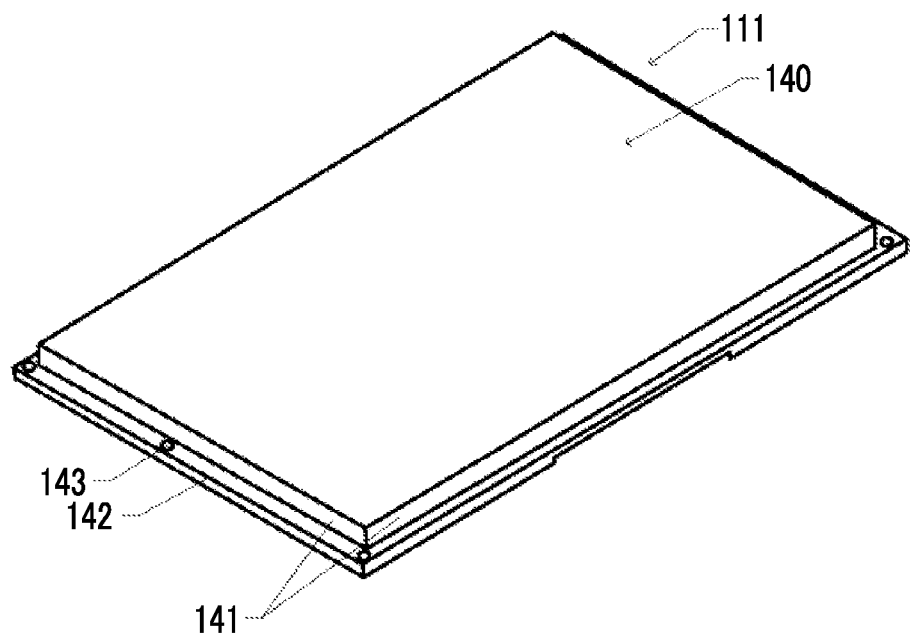
FIGS. 17A and 17B are perspective views respectively showing an upper housing and a lower housing where a storage module according to a fifth embodiment is accommodated.
Figure 17B:
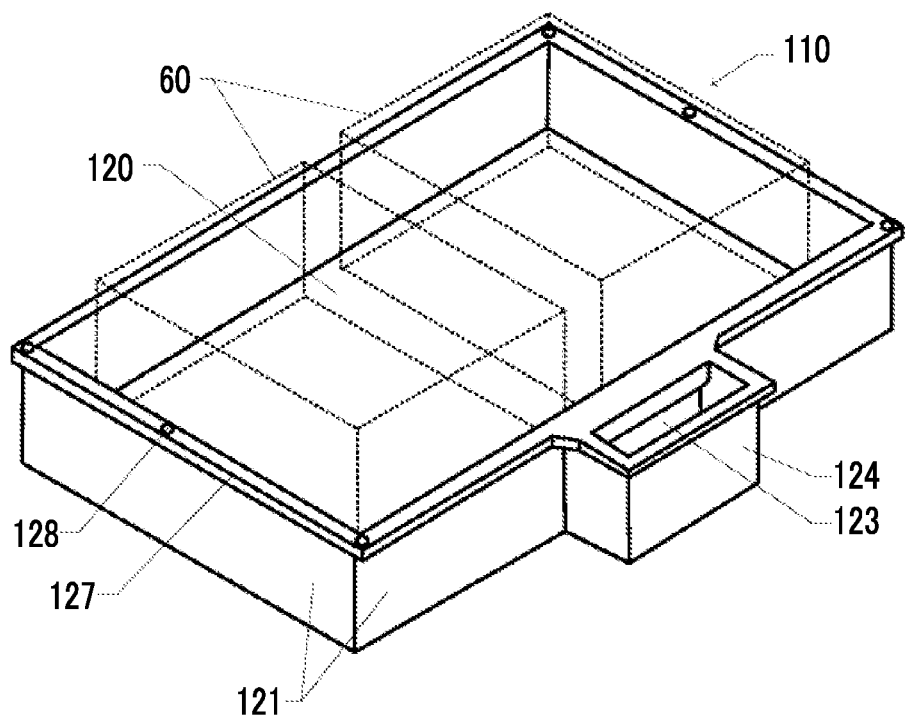

FIGS. 17A and 17B are perspective views respectively showing the upper housing 111 and the lower housing 110 where the storage module 60 according to a fifth embodiment is accommodated.

As shown in FIG. 17B, the lower housing 110 can have a rectangular bottom surface 120 and four side surfaces 121 extending upward from edges thereof. An upper portion of the lower housing 110 can be open. The open portion of the lower housing 110 can be blocked by the upper housing 111 (FIG. 17A). Collars 127 can be disposed at upper ends of the side surfaces 121. A plurality of through-holes 128 can be formed at the collars 127 such that bolts can pass therethrough. Each of the lower housing 110 and the upper housing 111 can be formed through, for example, a casting process.

The two storage modules 60 (FIGS. 16A and 16B) can be placed on the bottom surface 120. The storage module 60 can be screwed to the bottom surface 120 at the position of the notch 67 (FIG. 16A). The storage modules 60 can be arranged to have a posture in which the stacking directions thereof are in parallel to each other. An opening 123 can be formed on one of the side surfaces 121 intersecting with the stacking direction of each of the storage modules 60.

A connector box 124 can be arranged, to block the opening 123, on an outer side of the side surface 121 where the opening 123 is formed. An upper surface of the connector box 124 can be open. The open portion can be blocked by a connector. The storage module 60 can be connected to an external electric circuit via the connector. The two storage modules 60 can be connected to each other, via a fuse and a safety switch, in an end portion on the side opposite to the connector box 124.

As shown in FIG. 17A, the upper housing 111 can have an upper surface 140 and side surfaces 141 extending downward from edges thereof. The outer circumference of the upper surface 140 can match with the outer circumference of the bottom surface 120 of the lower housing 110. The side surface 141 of the upper housing 111 is lower in height than the side surface 121 of the lower housing 110. For example, the height of the side surface 141 can be approximately 25% of the height of the side surface 121. A collar 142 can be disposed at lower ends of the side surfaces 141. A plurality of through-holes 143 can be formed at the collar 142. The through-holes 143 can be arranged at positions corresponding to the through-holes 128 of the lower housing 110.

Cooling medium flow paths can be formed in the upper surface 140 of the upper housing 111 and the bottom surface 120 of the lower housing 110. When the through-holes 128 of the lower housing 110 and the through-holes 143 of the upper housing 111 are penetrated by bolts and fastened with nuts, the storage modules 60 can be pinched in an up-down direction by the upper housing 111 and the lower housing 110. As shown in FIG. 16B, the storage modules 60 can be firmly and non-slidably fixed into the housings since the heat exchanger plate 31 is pinched in the up-down direction by the lower housing 110 and the upper housing 111. In addition, heat transfer efficiency can be increased between the heat exchanger plate 31 and the lower housing 110 and between the heat exchanger plate 31 and the upper housing 111. Cooling mediums that flow in the flow path formed in the upper housing 111 and the flow path formed in the lower housing 110 cool the storage cells 20 (FIG. 16B) via the heat exchanger plates 31 (FIG. 16B).

Sixth Embodiment

Figure 18:
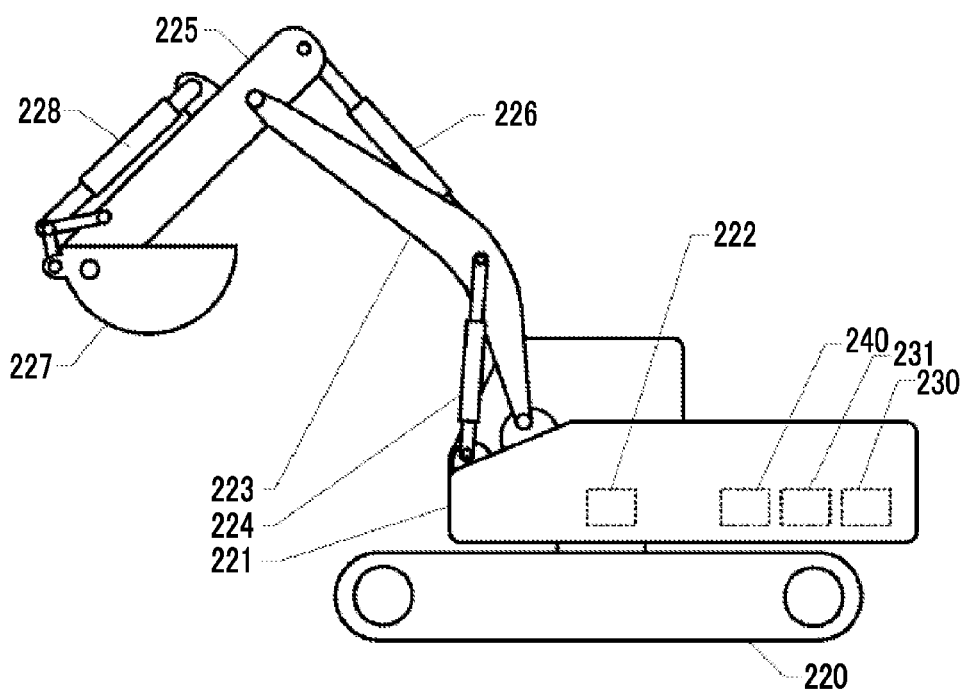
FIG. 18 is a side view of a shovel that is shown as an example of an operating machine according to a sixth embodiment.

FIG. 18 is a side view of a shovel that is shown as an example of an operating machine according to a sixth embodiment. An upper revolving body 221 can be placed on a lower traveling body 220. A boom 223 can be connected to the upper revolving body 221, an arm 225 can be connected to the boom 223, and a bucket 227 can be connected to the arm 225. A posture of the boom 223 can be changed when a boom cylinder 224 is expanded or contracted. A posture of the arm 225 can be changed when an arm cylinder 226 is expanded or contracted. A posture of the bucket 227 can be changed when a bucket cylinder 228 is expanded or contracted. The boom cylinder 224, the arm cylinder 226, and the bucket cylinder 228 can be hydraulically driven. A slewing motor 222, an engine 230, a motor generator 231, a storage circuit 240, and the like can be placed on the upper revolving body 221.

Figure 19:
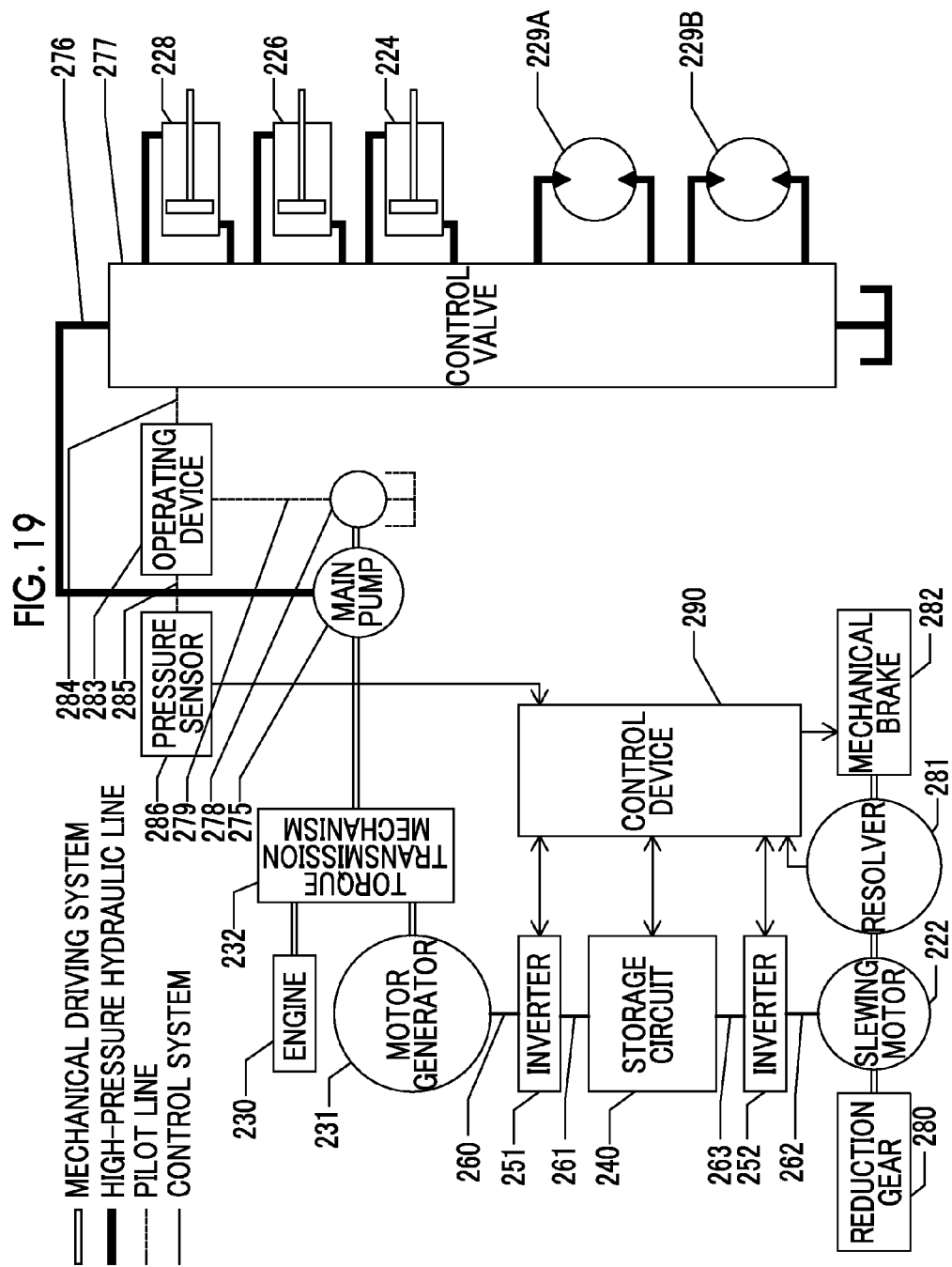
FIG. 19 is a block diagram of the operating machine according to this embodiment.

FIG. 19 is a block diagram of the operating machine according to this embodiment. In FIG. 19, a mechanical power system is represented by a double line, a high-pressure hydraulic line is represented by a thick solid line, an electric control system is represented by a thin solid line, and a pilot line is represented by a dashed line.

A drive shaft of the engine 230 can be connected to an input shaft of a torque transmission mechanism 232. An internal combustion engine such as a diesel engine which generates a driving force by using a fuel other than electricity can be used as the engine 230. The engine 230 is always driven when the operating machine is in operation.

A drive shaft of the motor generator 231 can be connected to the other input shaft of the torque transmission mechanism 232. The motor generator 231 can perform both driving operations of electric (assist) driving and a power generating operation. An interior permanent magnet (IPM) motor, in which a magnet is embedded in a rotor, can be used as an example of the motor generator 231.

The torque transmission mechanism 232 can have two input shafts and one output shaft. A drive shaft of a main pump 275 can be connected to the output shaft.

In a case where a large load is added to the main pump 275, the motor generator 231 can perform an assisting operation and a driving force of the motor generator 231 can be transmitted to the main pump 275 via the torque transmission mechanism 232. In this manner, the load that is added to the engine 230 can be reduced. In a case where a small load is added to the main pump 275, the driving force of the engine 230 can be transmitted to the motor generator 231 via the torque transmission mechanism 232 such that the motor generator 231 can perform the power generating operation.

The main pump 275 can supply hydraulic pressure to a control valve 277 via a high-pressure hydraulic line 276. The control valve 277 can distribute the hydraulic pressure to hydraulic motors 229A and 229B, the boom cylinder 224, the arm cylinder 226, and the bucket cylinder 228 according to a command from a driver. The hydraulic motors 229A and 229B can respectively drive two right and left crawlers of the lower traveling body 220 shown in FIG. 18.

The motor generator 231 can be connected to the storage circuit 240 via an inverter 251. The storage circuit 240 can have the storage modules according to the first five embodiments described above. The slewing motor 222 can be connected to the storage circuit 240 via an inverter 252. The inverters 251 and 252 and the storage circuit 240 can be controlled by a control device 290.

The inverter 251 can control the driving of the motor generator 231 based on a command from the control device 290. Switching between the assisting operation and the power generating operation of the motor generator 231 can be performed by the inverter 251.

Required power can be supplied to the motor generator 231 through the inverter 251 from the storage circuit 240 during a period of the assisting operation of the motor generator 231. Power generated by the motor generator 231 can be supplied to the storage circuit 240 through the inverter 251 during a period of the power generating operation of the motor generator 231. In this manner, the storage module in the storage circuit 240 can be charged.

The slewing motor 222 can be AC-driven by the inverter 252, and can perform both driving of a power running operation and a regenerative operation. An IPM motor can be used as an example of the slewing motor 222. Power can be supplied from the storage circuit 240 via the inverter 252 to the slewing motor 222 during the power running operation of the slewing motor 222. The slewing motor 222 can revolve the upper revolving body 221 (FIG. 18) via a reduction gear 280. During the regenerative operation, a rotational motion of the upper revolving body 221 can be transmitted to the slewing motor 222 via the reduction gear 280, and thus the slewing motor 222 can generate regenerated electric power. The regenerated electric power that is generated can be supplied to the storage circuit 240 via the inverter 252. In this manner, the storage module in the storage circuit 240 can be charged.

A resolver 281 can detect a position of a rotating shaft of the slewing motor 222 in a direction of rotation. A result of the detection by the resolver 281 can be input into the control device 290. The positions of the rotating shaft in the direction of rotation can be detected before the driving of the slewing motor 222 and after the driving of the slewing motor 222, and thus a revolving angle and a revolving direction can be derived.

A mechanical brake 282 can be connected to the rotating shaft of the slewing motor 222 and can generate a mechanical braking force. Switching between a braking state and a release state of the mechanical brake 282 can be performed by an electromagnetic switch controlled by the control device 290.

A pilot pump 278 can generate required pilot pressure in a hydraulic operation system. The pilot pressure that is generated can be supplied to an operating device 283 via a pilot line 279. The operating device 283 can have a lever and a pedal, and can be operated by the driver. The operating device 283 can convert a primary side hydraulic pressure that is supplied from the pilot line 279 to a secondary side hydraulic pressure according to the operation by the driver. The secondary side hydraulic pressure can be transmitted to the control valve 277 via a hydraulic line 284 and can be transmitted to a pressure sensor 286 via the other hydraulic line 285.

A pressure detection result that is detected by the pressure sensor 286 can be input into the control device 290. In this manner, the control device 290 can detect operation situations of the lower traveling body 220, the slewing motor 222, the boom 223, the arm 225, and the bucket 227 (FIG. 18).

The storage modules according to the first five embodiments can be placed in the operating machine such as the shovel as is the case with the sixth embodiment.

It should be understood that the invention is not limited to the above-described embodiment, but may be modified into various forms on the basis of the spirit of the invention. Additionally, the modifications are included in the scope of the invention.

What is claimed is:

1. A storage module comprising
a plurality of frame bodies; and
a plurality of electric storage cells that are respectively accommodated inside the plurality of frame bodies,
wherein at least one electric storage cell includes a pair of electrode tabs,
wherein at least one frame body includes
an electrode tab arrangement portion in which the electrode tabs are arranged on a first surface side of edges of the frame body, and
an elastic portion that is provided on a second surface side opposite to the first surface side in the edges of the frame body, and
wherein the electrode tab is interposed between the electrode tab arrangement portion and the elastic portion in a state where the frame bodies having the electric storage cells inside thereof are stacked.

2. The storage module according to claim 1,
wherein a part of the electrode tab is arranged between the frame bodies that are adjacent in the stacking direction of the frame bodies, and the elastic portion adds a force to the part of the electrode tab that is arranged between the frame bodies.

3. The storage module according to claim 1,
wherein the elastic portion includes a cantilever beam structure that is integrally molded with the frame body, and presses the electrode tab to the electrode tab arrangement portion when the cantilever beam structure is elastically deformed.

4. The storage module according to claim 1,
wherein in a state where the frame bodies having the electric storage cells inside thereof are stacked,
the plurality of frame bodies are arranged such that edges thereof oppose each other,
the plurality of electric storage cells are arranged so as to oppose each other,
the electrode tabs are arranged so as to extend from the inside to the outside of the frame bodies via a gap of the stacked frame bodies,
the electrode tabs that are provided in each of the plurality of electric storage cells are connected to each other in the outside of the frame body, and
the elastic portion is positioned between the edges of the frame bodies and applies a force to the electrode tabs at a position overlapping the edge.

5. The storage module according to claim 1,
wherein when the plurality of frame bodies are stacked, the elastic portion is interposed between the edges of the plurality of frame bodies and elastically deformed, to thereby press the electrode tabs against the electrode tab arrangement portion.

6. The storage module according to claim 1,
wherein the frame body is formed of a resin,
wherein the elastic portion includes a protrusion that is integrally formed with the frame body and protrudes from the edge of the frame body, and
wherein when the plurality of frame bodies are stacked, the elastic portion is interposed between the edges of the frame bodies and elastically deformed, to thereby press the electrode tabs against the electrode tab arrangement portion.

7. The storage module according to claim 1,
wherein the elastic portion is a sponge, and
wherein the sponge is arranged between the edges of the plurality of stacked frame bodies, and presses the electrode tabs against the edge of the frame body at a position of the edge.

* * * * *